United States Patent
Becker et al.

(10) Patent No.: US 8,082,302 B2
(45) Date of Patent: *Dec. 20, 2011

(54) AUTOMATICALLY SETTING CHAT STATUS BASED ON USER ACTIVITY IN LOCAL ENVIRONMENT

(75) Inventors: Craig Henry Becker, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 279 days.

This patent is subject to a terminal disclaimer.

(21) Appl. No.: 12/239,206

(22) Filed: Sep. 26, 2008

(65) Prior Publication Data

US 2009/0016510 A1 Jan. 15, 2009

Related U.S. Application Data

(63) Continuation of application No. 10/881,974, filed on Jun. 30, 2004, now Pat. No. 7,444,379.

(51) Int. Cl.
*G06F 13/00* (2006.01)

(52) U.S. Cl. ........ 709/204; 709/227; 715/758; 370/260; 370/261

(58) Field of Classification Search .......... 709/204–206, 709/227; 715/751–759; 370/260, 261
See application file for complete search history.

(56) References Cited

U.S. PATENT DOCUMENTS

| | | | |
|---|---|---|---|
| 7,283,805 B2 | 10/2007 | Agrawal | |
| 7,444,379 B2 * | 10/2008 | Becker et al. | 709/206 |
| 2002/0083127 A1 | 6/2002 | Agrawal | |
| 2003/0061622 A1 | 3/2003 | Nebiker et al. | |
| 2005/0080866 A1 | 4/2005 | Kent, Jr. et al. | |

* cited by examiner

*Primary Examiner* — Kenneth R Coulter
(74) *Attorney, Agent, or Firm* — Yee & Associates, P.C.; Libby Z. Toub

(57) ABSTRACT

A method is presented for managing user chat status in a chat application. The chat application automatically detects user activity and/or user inactivity external to the chat application and then automatically sets a user chat status value within the chat application based on the detected user activity and/or the detected user inactivity based on telephone line activity. Caller ID information associated with an incoming call with respect to one or more selected priority telephone numbers are screened. The chat application may automatically set the user's current chat status at a given time based on telephone line activity only if the caller ID information associated with the incoming telephone call matches a priority telephone number.

4 Claims, 7 Drawing Sheets

AUTOMATICALLY SETTING CHAT STATUS BASED ON USER ACTIVITY IN LOCAL ENVIRONMENT

This application is a continuation of application Ser. No. 10/881,974, filed Jun. 30, 2004, and issued as U.S. Pat. No. 7,444,379 on Oct. 28, 2008.

BACKGROUND OF THE INVENTION

1. Field of the Invention

The present invention relates to an improved data processing system and, in particular, to a method and system for multi-computer data transferring. Still more particularly, the present invention provides a method and system for multi-user communication using instant messaging.

2. Description of Related Art

In most instant messaging systems, the activity status or the availability status of a particular user is reflected to other users of an instant messaging system by associating one of many variable status values with the user account. These status values assist other users in assessing whether it is possible for the other users to initiate an instant messaging session with the given user. For example, an "offline" status shows that a given user is not logged onto the system, thereby informing other users that any attempt to initiate an instant messaging session with the given user would be futile. An "online" status shows that a user is logged onto the system, and other users may assume that they are likely to get a response when they initiate an instant messaging session with the given user.

In some cases, an instant messaging system automatically assigns a certain status value to a user, and this automatic assignment of status can be very helpful in facilitating communication between users. For example, in most instant messaging applications, a user is given the ability to maintain a buddy list; a buddy is another user of the instant messaging application with which the user often exchanges instant messages. The instant messaging system might automatically assign a user an "online" status value when the user logs onto the system; at the same time, a buddy list typically actively displays the status of each buddy. By displaying the buddy list in an open window of a client device, a user has the ability to easily monitor the online status of the user's buddies; when the user notices that a particular buddy's status has changed from "offline" to "online", the user can quickly initiate an instant messaging session with that particular buddy. In some instant messaging systems, an automatic assignment of status is only performed when the user has not previously designated an alternative status; in many cases, the user is able to override an automatically assigned status value by changing it to some other status value.

Although the indication of user status can be helpful in facilitating communication between users, it can also be disruptive to a user's productivity by distracting a user from other activities. Hence, many instant messaging systems allow a user to manually select from several possible status values. In some cases, various privacy-related status values can be selected that control whether other users are informed of a given user's current status. These status values restrict the other users from knowing the true status of the given user, thereby prohibiting those users from beginning an instant message conversation with the given user; for example, a user can hide his or her status by manually selecting an "invisible" status that hides the user's true online status from other users while allowing the user to remain online, and the other users receive only an indication that the user has an offline status.

In other cases, various privacy-related status values can be selected that inform other users of the likelihood that they will be able to initiate an instant messaging session with a given user. For example, a "busy" status indicates that the given user is currently doing some other activity, while a "be right back" status would indicate to other users that the given user is temporarily away from his or her computer. As another example, a "do not disturb" status would indicate to other users that are interested in the given user's status that the given user does not want to be interrupted by instant messaging sessions. During any period in which the user has one of these status values, though, the user is able to monitor the status of other online users or to have the ability to start instant messaging sessions with other online users, assuming that the other users do not have a busy status or similar status.

As should be apparent from the above-noted exemplary status values, a set of status values in an instant messaging application can reflect a degree of availability or unavailability of a given user, which may be manually selected by the user. At any given time, though, the user is generally concentrating on a particular task or a few tasks in the user's local environment, and the user might frequently forget to select an instant messaging status that accurately reflects the user's current availability for actively engaging in an instant messaging session.

Therefore, it would be advantageous for an instant messaging application to provide a user with assistance in automatically setting a currently appropriate status value based on the user's activity within the user's local environment.

SUMMARY

A method, an apparatus, a system, and a computer program product are presented for managing availability status values in a chat application. The chat application automatically detects user activity and/or user inactivity external to the chat application and then automatically sets a user chat status value within the chat application based on the detected user activity and/or the detected user inactivity based on telephone line activity. Caller ID information associated with an incoming call with respect to one or more selected priority telephone numbers are screened. The chat application may automatically set the user's current chat status at a given time based on telephone line activity only if the caller ID information associated with the incoming telephone call matches a priority telephone number.

BRIEF DESCRIPTION OF THE DRAWINGS

The novel features believed characteristic of the invention are set forth in the appended claims. The invention itself, further objectives, and advantages thereof, will be best understood by reference to the following detailed description when read in conjunction with the accompanying drawings, wherein:

DETAILED DESCRIPTION OF THE INVENTION

In general, the devices that may comprise or relate to the present invention include a wide variety of data processing technology. Therefore, as background, a typical organization of hardware and software components within a distributed data processing system is described prior to describing the present invention in more detail.

Figure 1A:
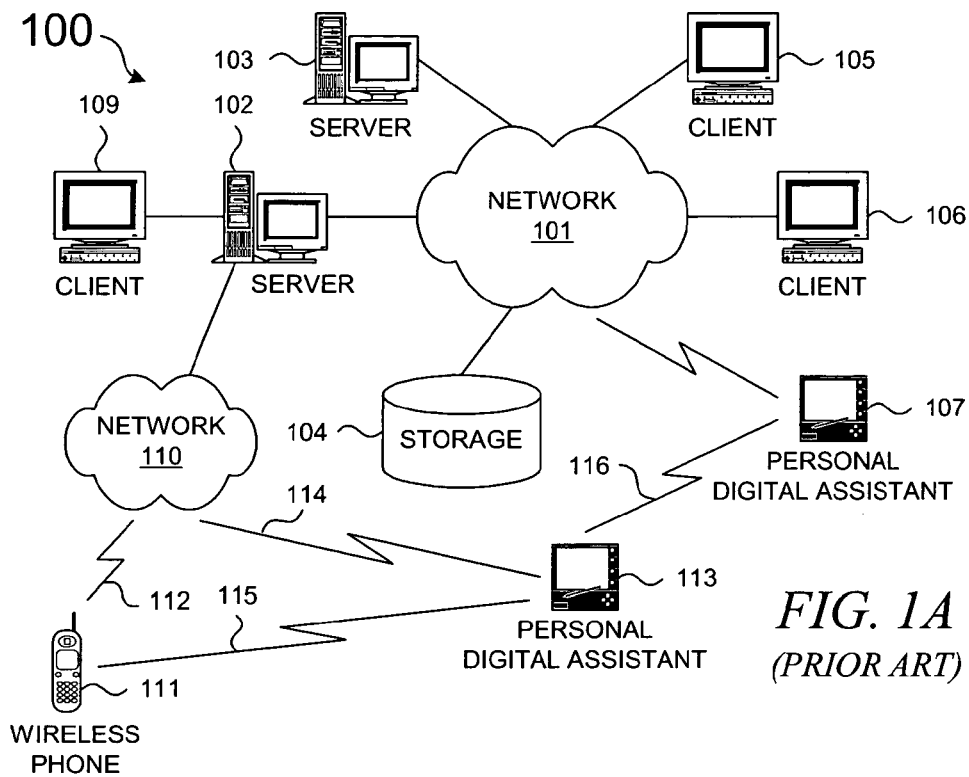
FIG. 1A depicts a typical distributed data processing system in which the present invention may be implemented.

With reference now to the figures, FIG. 1A depicts a typical network of data processing systems, each of which may implement a portion of the present invention. Distributed data processing system 100 contains network 101, which is a medium that may be used to provide communications links between various devices and computers connected together within distributed data processing system 100. Network 101 may include permanent connections, such as wire or fiber optic cables, or temporary connections made through telephone or wireless communications. In the depicted example, server 102 and server 103 are connected to network 101 along with storage unit 104. In addition, clients 105-107 also are connected to network 101. Clients 105-107 and servers 102-103 may be represented by a variety of computing devices, such as mainframes, personal computers, personal digital assistants (PDAs), etc. Distributed data processing system 100 may include additional servers, clients, routers, other devices, and peer-to-peer architectures that are not shown.

In the depicted example, distributed data processing system 100 may include the Internet with network 101 representing a worldwide collection of networks and gateways that use various protocols to communicate with one another, such as Lightweight Directory Access Protocol (LDAP), Transport Control Protocol/Internet Protocol (TCP/IP), File Transfer Protocol (FTP), Hypertext Transport Protocol (HTTP), Wireless Application Protocol (WAP), Common Presence and Instant Messaging (CPIM) protocols, etc. Of course, distributed data processing system 100 may also include a number of different types of networks, such as, for example, an intranet, a local area network (LAN), or a wide area network (WAN). For example, server 102 directly supports client 109 and network 110, which incorporates wireless communication links. Network-enabled phone 111 connects to network 110 through wireless link 112, and PDA 113 connects to network 110 through wireless link 114. Phone 111 and PDA 113 can also directly transfer data between themselves across wireless link 115 using an appropriate technology, such as Bluetooth™ wireless technology, to create so-called personal area networks (PAN) or personal ad-hoc networks. In a similar manner, PDA 113 can transfer data to PDA 107 via wireless communication link 116.

The present invention could be implemented on a variety of hardware platforms; FIG. 1A is intended as an example of a heterogeneous computing environment and not as an architectural limitation for the present invention.

Figure 1B:
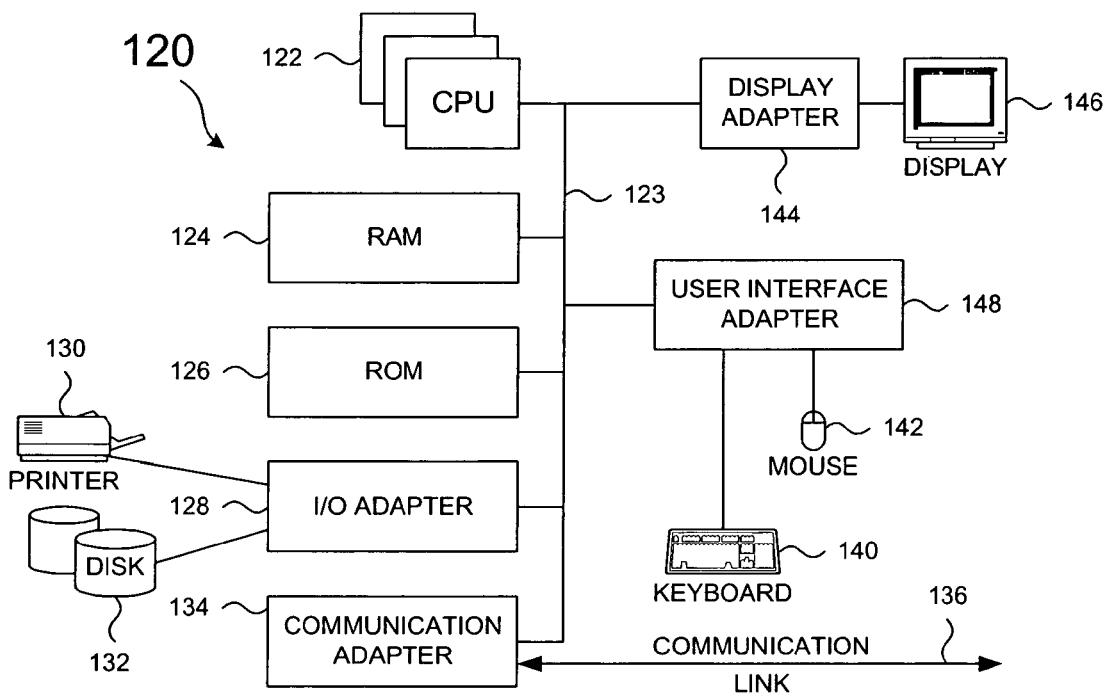
FIG. 1B depicts a typical computer architecture that may be used within a data processing system in which the present invention may be implemented.

With reference now to FIG. 1B, a diagram depicts a typical computer architecture of a data processing system, such as those shown in FIG. 1A, in which the present invention may be implemented. Data processing system 120 contains one or more central processing units (CPUs) 122 connected to internal system bus 123, which interconnects random access memory (RAM) 124, read-only memory 126, and input/output adapter 128, which supports various I/O devices, such as printer 130, disk units 132, or other devices not shown, such as a audio output system, etc. System bus 123 also connects communication adapter 134 that provides access to communication link 136. User interface adapter 148 connects various user devices, such as keyboard 140 and mouse 142, or other devices not shown, such as a touch screen, stylus, microphone, etc. Display adapter 144 connects system bus 123 to display device 146.

Those of ordinary skill in the art will appreciate that the hardware in FIG. 1B may vary depending on the system implementation. For example, the system may have one or more processors, such as an Intel® Pentium®-based processor and a digital signal processor (DSP), and one or more types of volatile and non-volatile memory. Other peripheral devices may be used in addition to or in place of the hardware depicted in FIG. 1B. The depicted examples are not meant to imply architectural limitations with respect to the present invention.

In addition to being able to be implemented on a variety of hardware platforms, the present invention may be implemented in a variety of software environments. A typical operating system may be used to control program execution within each data processing system. For example, one device may run a Unix® operating system, while another device contains a simple Java® runtime environment. A representative computer platform may include a browser, which is a well known software application for accessing hypertext documents in a variety of formats, such as graphic files, word processing files, Extensible Markup Language (XML), Hypertext Markup Language (HTML), Handheld Device Markup Language (HDML), Wireless Markup Language (WML), and various other formats and types of files.

The present invention may be implemented on a variety of hardware and software platforms, as described above with respect to FIG. 1A and FIG. 1B. More specifically, though, the present invention is directed to operating an instant messaging system, as described in more detail below with respect to the remaining figures. It should be noted that the examples that are described hereinbelow often refer to users and systems; it should be understood that a user interacts with a system such that the system performs actions on behalf of a user, and the terms "user" and "system" can sometimes be interchanged in a well-known manner to facilitate the description of operations at a data processing system.

Instant messaging is becoming a common form of communication in personal and business environments. As often occurs with a novel activity, new terminology has been created to assist people in efficiently discussing instant messaging. The act of initiating an instant messaging session with someone has been used as a verb, e.g., "to instant message" someone, or more succinctly, "to IM" someone. Given the difficulty of pronouncing the juxtaposed vowel sounds in "IM", the term "to PM" someone has also become common, meaning "to personal message" someone. In the context of an instant messaging system, though, the act of initiating an instant messaging session with someone has also been termed "to call" someone in a manner similar to using the telephone to establish a communication session with a remote person. In addition, the act of engaging in an instant messaging session with someone has also been described as the act of "chatting". Thus, "instant message" is often interchangeable with "chat", e.g., an instant message session and a chat session are equivalent terms.

The examples hereinbelow include descriptions of a buddy. A buddy is a remote user of an instant messaging application (client application) with which a user of a local instant messaging application often exchanges instant messages. A buddy is represented by an instant messaging application with an appropriate data entity or data object, herein referred to as a buddy object. A buddy object may comprise many attributes, properties, or other types of information. The buddy object may be presented on a display device in a visual manner by an instant messaging application; the information that is displayed may be a graphical representation of a buddy object, such as a thumbnail picture or an icon, or the information may be in some other form, such as a textual identifier. The description of the invention hereinbelow relies on a well-known understanding of the operation of graphical user interfaces in which visual/textual objects on a display device represent a series of abstractions. The user interacts through the graphical user interface to manipulate visually represented data objects, which may represent some other type of data object, such as a buddy object, which itself represents a real user. Hence, the terms "buddy", "buddy object", or some other term for an associated data object can sometimes be interchanged in a well-known manner to facilitate the description of operations at a data processing system.

With reference now to FIG. 2A, a block diagram depicts a typical instant messaging system. Typical instant messaging systems have characteristics of a client/server organization and a peer-to-peer organization. Instant messaging (IM) server 200 authenticates a user of an instant messaging application, such as instant message application instances 202 and 204. After authenticating a user, the instant messaging server will perform certain operations on behalf of the instant messaging application. In this manner, an instance of an instant messaging application operates as an instant messaging client. The instant messaging server maintains some type of session for each active instant messaging client, which eventually logs out from the session or allows the session to undergo a timeout termination.

However, after being initialized with certain information, depending on the communication protocol, active instant messaging clients can communicate directly with each other by transferring instant messages directly to another active instant messaging client without assistance from the instant messaging server. In this manner, the separate instances of the instant messaging application act as peer nodes in a peer-to-peer network. Many instant messaging systems employ proprietary protocols, although standard instant messaging protocols have been proposed, e.g., the Jabber protocols (information available from http://www.jabber.org) or Crocker et al., "Common Presence and Instant Messaging (CPIM)", Internet Draft of the Internet Engineering Task Force (IETF), draft-ietf-impp-cpim-03.txt, August 2002. The exemplary embodiments of the present invention that are described hereinbelow are intended to operate with proprietary or non-proprietary protocols regardless of the instant messaging system or framework.

For example, assuming that a user has previously registered for an account with the instant messaging server, a user logs into the instant messaging server through an instant messaging application on a client device. The instant messaging server stores the connection information for the client device, such as the IP address of the client device and the port number that is assigned to the instant messaging application at the client device.

During the login operation, the instant messaging server also receives and stores an IM contact list, often referred to as a buddy list, for the user along with the user's connection information and other session information. The server performs an initial check to obtain the status of the users in the buddy list and notifies the user's active instant messaging client of the status of those users, e.g., whether those users are online and available for communication through the instant messaging system. The server monitors these buddy lists such that when a user logs into the instant messaging system, the server notifies anyone who has the recently logged-in user within a buddy list that the recently logged-in user is now online or is associated with some other type of status.

Assuming that a buddy has not chosen to remain cloaked within an "invisible" status, when the instant messaging server notifies a first instant messaging client that a second instant messaging client is online, the instant messaging server sends the connection information for the second instant messaging client to the first instant messaging client and perhaps vice versa depending upon the online status of the user. Because each active instant messaging client has connection information for other active instant messaging clients in the instant messaging system, these instant messaging clients can transfer instant messages between themselves without interaction with the instant messaging server, i.e. in a peer-to-peer manner.

Figure 3:
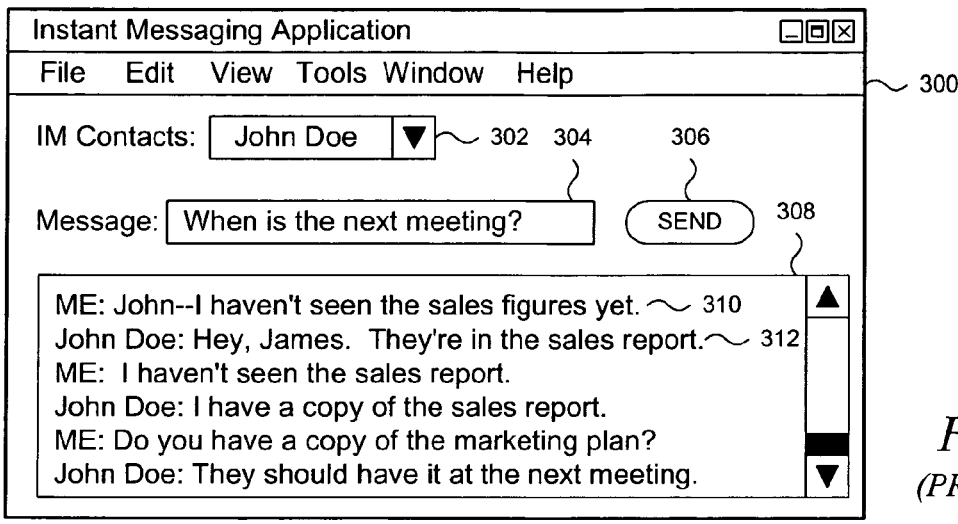
FIG. 3 depicts a diagram that shows a typical graphical user interface window for an instant messaging application that shows the text of an instant messaging session.

With reference now to FIG. 3, a diagram depicts a typical graphical user interface window for an instant messaging application that shows the text of an instant messaging session. Text strings and file attachments for the instant messages of an instant messaging session are presented to a user of an active instant messaging client in a GUI window. Window 300 is presented on a display device connected to a data processing system on which an instance of an instant messaging application is executing for a user. In a typical fashion for an instant messaging application, window 300 contains several user interface controls for operating the instant messaging application. Drop-down menu 302 contains the user's contact list. Text entry field 304 allows entry of a text string to be sent as an instant message. "SEND" button 306 initiates a transmit operation to generate and send the contents of the text entry to the selected instant message contact.

A history of the instant messages within an instant messaging conversation is typically shown within a scrolling window; it is expected that both users of the instant messaging session will view the same content within their respective GUI windows during an instant messaging conversation. Scrollable text area 308 contains the history of the instant messaging conversation. Text line 310 is the initial instant message that was sent by a local user to the remote user; text line 312 is the response from the remote user, and the remaining text lines in text area 308 reflect instant messages for the continuing conversation. The instant messaging application may separately maintain different conversations in different windows during a user's instant messaging session, which may run for an extended period of time, e.g., during business hours within a corporate context.

Figure 4:
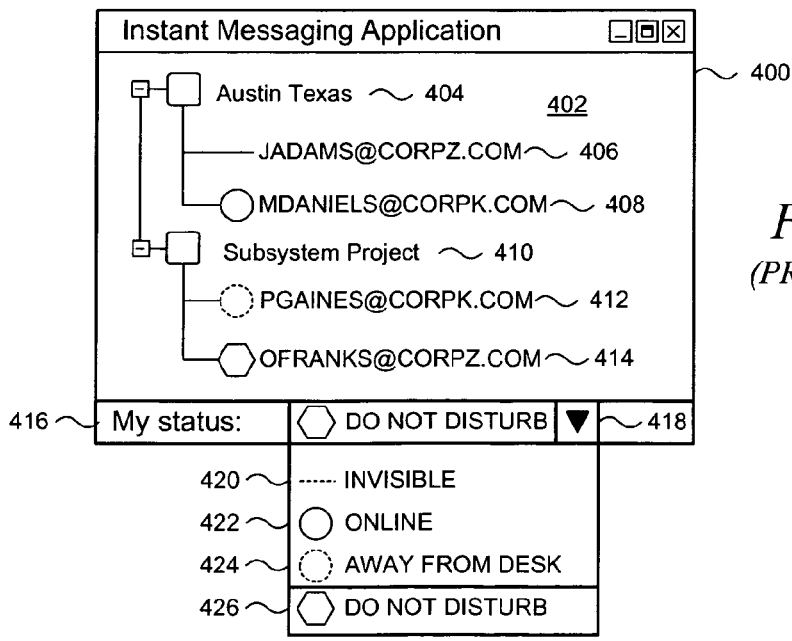
FIG. 4 depicts a diagram that shows a typical graphical user interface window for an instant messaging application that shows an IM contact list or buddy list.

With reference now to FIG. 4, a diagram depicts a typical graphical user interface window for an instant messaging application that shows an IM contact list or buddy list. For a given user of an instant messaging application or system, a buddy is a remote user of the instant messaging system with whom the given user exchanges instant messages. Most instant messaging applications provide a mechanism for organizing information about a list of buddies. Window 400 is a typical GUI window for a buddy list within an instant messaging application. Buddy list area 402 shows multiple buddies in a buddy list, and the buddy list is organized in a hierarchical fashion with buddies possibly included within a group of buddies, such as group 404 or group 406.

The instant messaging application or system monitors these buddy lists such that when a user logs into the instant messaging system, the server notifies anyone who has the recently logged-in user within a buddy list that the recently logged-in user is now online or is associated with some other type of status. In this manner, assuming that a buddy has not chosen to remain cloaked within an "invisible" or similar status, instant messaging users are constantly aware of the status of the users within their buddy lists because an instant messaging client is updated relatively quickly with the appropriate information. The instant messaging client typically provides visual indicators in a buddy list window that indicate the status of a buddy. Each buddy object in the buddy list has an associated status indicator. By glancing at a visual representation of a buddy object, a user can quickly determine which type of status is associated with the buddy represented by the buddy object. For example, buddy 408 does not have an associated status indicator icon, thereby indicating that the buddy probably has an "offline" status, although the user may be hiding under an "invisible" status or some other status even though the user is actually logged onto the instant messaging system. In addition, buddy 410 has an "online" status; buddy 412 has an "away from desk" status; and buddy 414 has a "do not disturb" status.

Status bar 416 indicates the current instant messaging status of the user of the instant messaging application. In the example that is shown in FIG. 4, the user has a "do not disturb" status; hence, if the user is included as a buddy in other users' buddy lists, the status of the user would appear in a manner similar to that shown for the user's buddy 414. The user's status is displayed in conjunction with a drop-down menu 418 that contains selectable instant messaging status values, thereby allowing the user to change the user's instant messaging status as desired. If the user selects a menu item within drop-down menu 418, then the selected status is transmitted to anyone who has included the user within a buddy list.

As noted previously, the indication of a user's instant messaging status can be helpful in facilitating communication between users, but it can also be disruptive to a user's productivity by distracting a user from other activities. Hence, many instant messaging systems allow a user to manually select from several privacy-related status values that control whether other users are informed of a given user's current status. These status values restrict the other users from knowing the true status of the given user, thereby prohibiting those users from beginning an instant message conversation with the given user. In the example that is shown in FIG. 4, menu item 420 allows a user to select an "invisible" status that hides a user's status from other users; if a user selects menu item 420, then the user would continue to appear in other users' buddy lists with an "offline" status in a manner similar to buddy 408 in the user's buddy list 402, even after the user has actually logged onto the instant messaging system. If the user later desires to appear as available for chatting with other users, then the user can select menu item 422, which allows a user to select an "online" status.

As another example of a restrictive status, menu item 424 allows a user to select an "away from desk" status that informs other users that the user would probably not respond to an instant messaging session because the user is supposed to be elsewhere; if a user selects menu item 424, then the user would appear in other users' buddy lists with the status indicator icon that is shown in menu item 424. As yet another example of a restrictive status, menu item 426 allows a user to select a "do not disturb" status that informs other users that they cannot initiate an instant messaging session with the user; if a user selects menu item 426, then the user would appear in other users' buddy lists with the status indicator icon that is shown in menu item 426.

Given the background information that has been provided above with respect to prior art instant messaging systems, the description turns now to the present invention, which addresses problems in the operation of prior art instant messaging systems. As noted above, prior art instant messaging systems provide many different chat status values for informing users of the availability or the degree of availability of other users for engaging in a chat session.

Although these status values may be manually selected by a user, some of these status values are automatically determined by the instant messaging system itself, e.g., "offline" or "busy". However, when an instant messaging system automatically determines a status value for a user, the instant messaging system automatically determines the status value based on the interaction between the user and the instant messaging system.

From another perspective, the instant messaging system monitors the user's interactions with respect to itself, or conversely, the instant messaging system is configured to observe its own actions with respect to the user; from these observed actions or monitored states, the instant messaging system automatically determines the user's chat status. For example, the instant messaging system can maintain a state that reflects that the user has completed an authentication operation with respect to the instant messaging system, i.e. a logged-in state for the user; based on this state, the instant messaging system informs other users that the user has an online status, assuming that the instant messaging system has not assigned a different chat status to the user and assuming that the user has not overridden the online status by selecting some other type of status value.

Hence, in the prior art, an instant messaging system can only determine the user status automatically based on the internal operations of the instant messaging system, i.e. based on user activity with respect to the instant messaging system or based on user activity within the instant messaging system. The manner in which these determinations are completed can be problematic because the determined chat status may not appropriately reflect the user's availability or desire to engage in a chat session at a given time. For example, although a user may be logged into an instant messaging application, the user may not want to inform other users that he or she is available to engage in a chat session if the user is busy doing something that does not involve the instant messaging application, i.e. external to the instant messaging application or without the instant messaging application. The phrase "user activity external to the instant messaging application" or "user activity external to the instant messaging system" may refer to user activity with respect to the host computer or with respect to a distributed data processing system that includes the host system, but the phrase does not include the instant messaging application or system.

To make the example more specific, an office worker might listen to a conference call while reading email messages; at the same time, the office worker's instant messaging application may report that he or she has an online status, thereby informing other users that the office worker is available for chat sessions. However, the office worker may not wish to engage in an instant messaging session while using the telephone and/or while using an email program, yet an instant messaging session may have already been initiated by a remote user who was informed by the instant messaging system that the office worker had an online status.

The prior art instant messaging systems are also problematic because, even though an office worker could override an automatically determined chat status and could manually select a more appropriate chat status value that more accurately reflects the availability and/or desirability of the user to engage in a chat session, the office worker may often forget to do so. For example, a user might engage in a chat session, then make a telephone call, then review a document. These tasks may occur during separate but quickly successive time periods, or there may also be some temporal overlap of the tasks; in many situations, the user's attention would be diverted away from the instant messaging application, and the user would forget to attend to the necessity of changing the user's current chat status.

The present invention recognizes that a user may multitask within the user's local environment, thereby creating a need for user assistance in automatically setting an appropriate chat status for the user in an instant messaging system. Moreover, the present invention is directed to improving the manner in which an instant messaging system automatically determines a chat status that is appropriate to the user based on the user's activities within the local environment but without the instant messaging system, i.e. external to the instant messaging system. The present invention accommodates these needs as described in more detail below with respect to the remaining figures.

Figure 2:
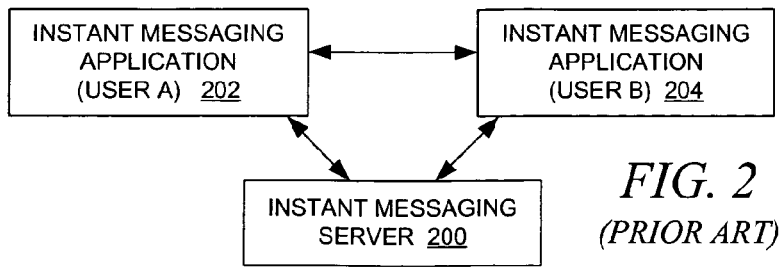
FIG. 2 depicts a block diagram that shows a typical instant messaging system.
Figure 5:
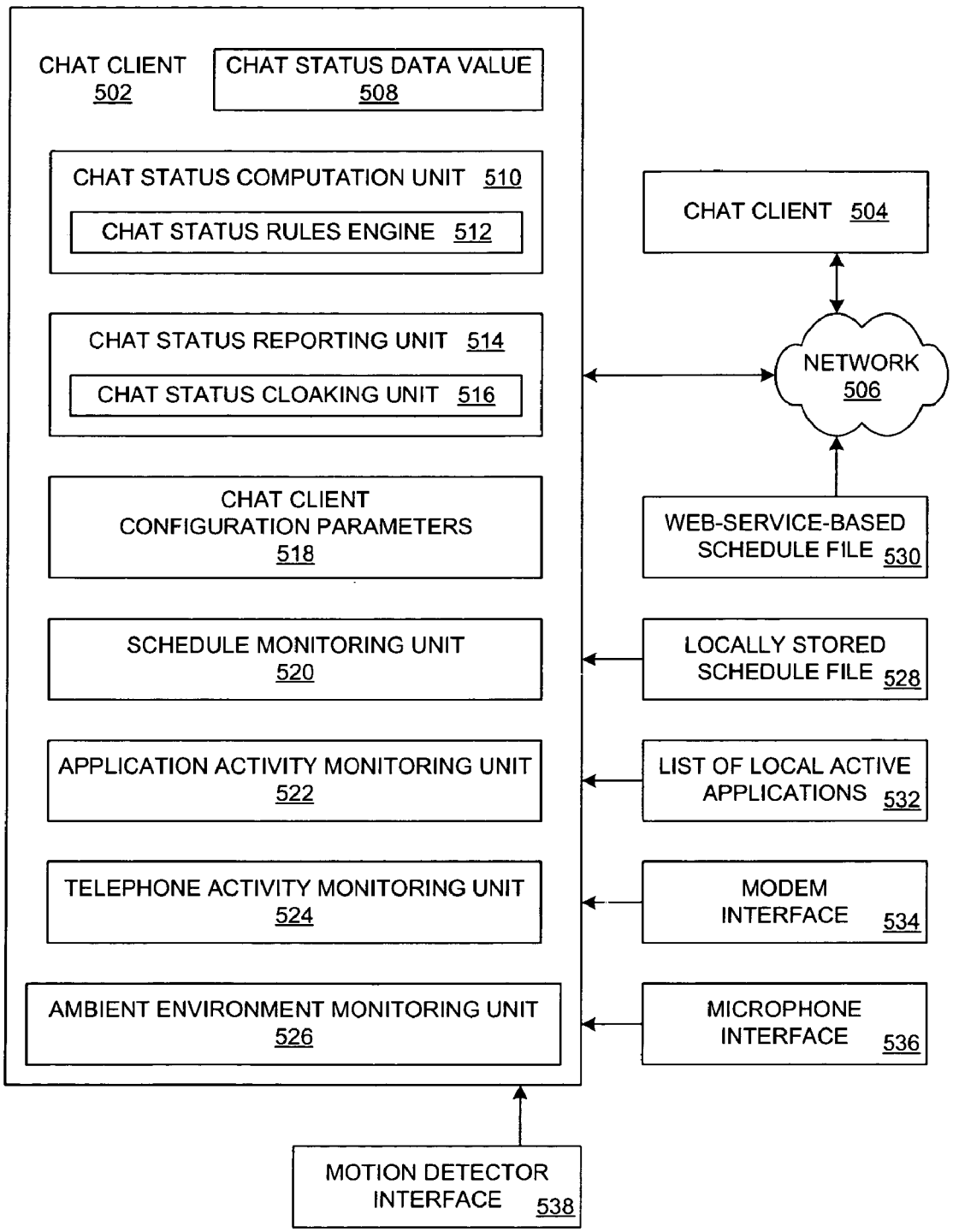
FIG. 5 depicts a block diagram that shows the logical organization of some of the components of an instant messaging application in accordance with an embodiment of the present invention.

With reference now to FIG. 5, a block diagram depicts the logical organization of some of the components of an instant messaging application in accordance with an embodiment of the present invention. Chat client 500 is part of an instant messaging system, e.g., similar to instant messaging application 202 that is shown in FIG. 2; chat client 500 can engage in chat sessions with another chat client, such as chat client 504, via network 506, which is similar to network 101 in FIG. 1A. Chat status data value 508 stores the value of the current chat status for the user of chat client 502, which may be presented to the user in a graphical user interface window, such as window 400 that is shown in FIG. 4.

Chat client 502 contains a variety of components for performing various functions for implementing chat sessions. The components may be implemented in hardware or software, but the example assumes that the components are implemented as software modules, procedures, subroutines, functions, objects, or some other type of software entity. Chat status computation unit 510 computes the current chat status using chat status rules engine 512 and stores it as chat status data value 508. Chat status reporting unit 514 relays chat status data value 508 to other chat clients when necessary; chat status reporting unit 514 contains chat status cloaking unit 516 for modifying the user's current chat status such that other chat clients cannot view the user's true current chat status; e.g., the user may want to remain completely hidden with respect to some users while allowing other users to see the user's chat status, which might allow some users to initiate a chat session while other are prevented from doing so.

Chat status rules engine 512 contains logic for implementing a plurality of rules regarding the determination of the user's current chat status from the state of chat client 502, including chat client configuration parameters 518 and information about the user's activities as derived by other components within chat client 502. Chat status rules engine 512 may comprise a set of if-then-else statements that determine the truth of boolean expressions with respect to configuration parameters 518 and other information; alternatively, chat status rules engine may be implemented in some other manner, e.g., using a software language such as Prolog.

As mentioned above, in the prior art, an instant messaging system can only determine the user status automatically based on the internal operations of the instant messaging system. In contrast, the present invention is directed to improving the manner in which an instant messaging system automatically determines a chat status that is appropriate to the user based on the user's activities within the local environment; FIG. 5 illustrates some of the mechanisms that may be employed in an embodiment of the present invention to fulfill this goal.

As noted above, a user of a chat client may have many reasons that the user is not able to engage in a chat session at any given time; all of these reasons are related to the fact that the user is typically busy doing other tasks such that the user is not focusing on the chat client at that given time. In the example of an embodiment of the present invention that is shown in FIG. 5, chat client 502 gathers information about the user's activities within the local environment using various components, each of which attempts to address a different reason why the user's ability to engage in a chat session might be impaired at any given time. These components are configured and controlled through configuration parameters 518. Chat client 502 employs schedule monitoring unit 520, application activity monitoring unit 522, telephone activity monitoring unit 524, ambient environment monitoring unit 526, and/or any other modules that may assist chat client 502 in determining relevant information about the user's activities that may affect the user's ability to engage in chat sessions using chat client 502. Examples of the manner in which chat computation unit 510 uses information gathered by these units is explained in more detail further below.

Figure 6:
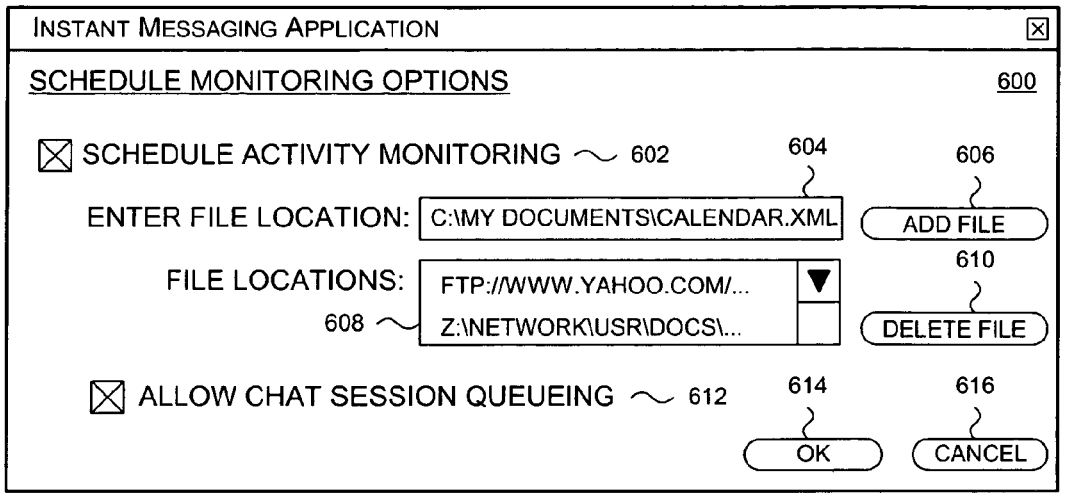
FIG. 6 depicts a diagram that shows a graphical user interface window for an instant messaging application that allows a user of the instant messaging application to enter or select configuration parameters that will be used to control the manner in which the instant messaging application operates with respect to its schedule monitoring unit.

One reason that a user may not be able to engage in a chat session is that the user is away from the data processing system that supports the chat application. For example, the user might be away from his or her office while attending a meeting, or more generally, the user is away from a data processing system while attending some type of appointment. Assuming that the user manages an electronic calendar/schedule, schedule monitoring unit 520 gathers information about a user's schedule from one or more sources. Chat client 502 may be able to automatically set the user's current chat status at a given time based on the gathered schedule information that reflects the user's activity at that given time. FIG. 6 below illustrates an example of a graphical user interface window that a user may employ to set configuration parameters for schedule monitoring unit 520.

For example, the user may use a calendar application on the data processing system that also supports chat client 502, which may store the user's schedule information in locally stored schedule file 528; the calendar application allows the user to keep track of his or her appointments, projects, timelines, and various activities. Many web portals provide such calendar functions, and schedule monitoring unit 520 may retrieve a data file containing schedule information from a location within the Internet, e.g., schedule file 530 that is hosted by a web site and that can be retrieved by chat client 502 via a web service architecture. Alternatively, schedule monitoring unit 518 may retrieve schedule information from a so-called personal information manager (PIM) application that integrates schedule/calendar information with other types of applications and devices, such as a personal digital assistant (PDA). The schedule information may be stored and manipulated in any appropriate data format, e.g., the vCalendar file format.

Figure 7:
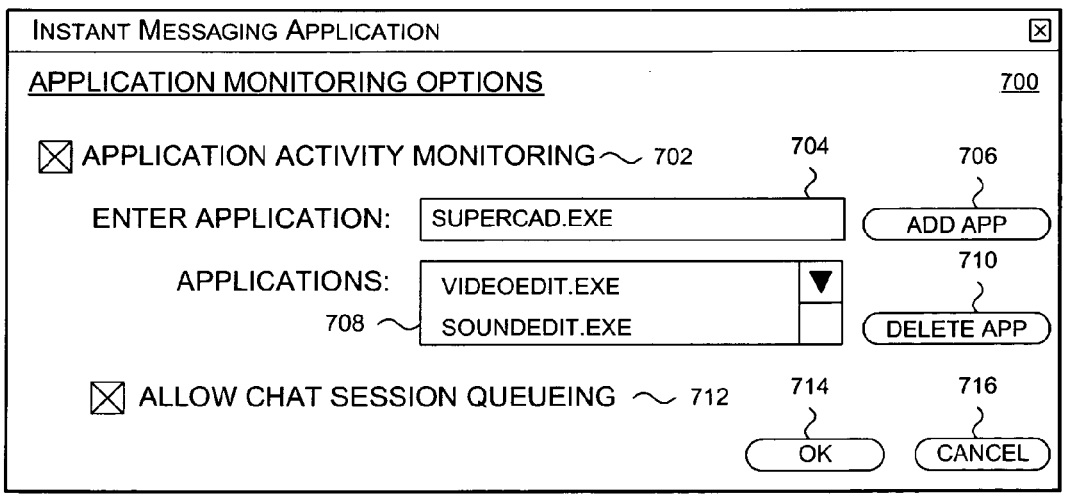
FIG. 7 depicts a diagram that shows a graphical user interface window for an instant messaging application that allows a user of the instant messaging application to enter or select configuration parameters that will be used to control the manner in which the instant messaging application operates with respect to its application activity monitoring unit.

Another reason that a user may not be able to engage in a chat session is that the user is busy using another software application on the host computer or the supporting data processing system. Application activity monitoring unit 522 gathers information about the user's activities with respect to other software applications from one or more sources, such as list 532 of local active applications. Alternatively, application activity monitoring unit 522 gathers information through any appropriate mechanism that may be provided by the operating system of the host computer, such as the number and/or frequency of keyboard events or mouse events, which reflect that the user is busy giving input to applications other than the chat client, which assumes that the chat client is able to determine that the user is not providing input to the chat client. Chat client 502 may be able to automatically set the user's current chat status at a given time based on the application activity information that reflects the user's activity at that given time. FIG. 7 below illustrates an example of a graphical user interface window that a user may employ to set configuration parameters for application activity monitoring unit 522.

For example, a user may not wish to be disturbed to engage in a chat session while the user is using a software application that requires a significant mental focus by the user, e.g., a computer-assisted drawing (CAD) program. Application activity monitoring unit 522 may retrieve information about active programs from the operating system, which may allow applications to read the kernel's task or process table. This retrieved information may be as detailed as necessary to obtain an accurate determination; e.g., the user's CAD program may be open for long periods of time without the user actually using the program, and the existence of the CAD program within the process table may not accurately reflect that the user is actively using the program. Hence, application activity monitoring unit 522 may examine the amount of CPU usage that is being consumed by the CAD program, and if it is consuming more CPU cycles than most other active programs, then application activity monitoring unit 522 may assume that the user is actively using the CAD program.

Figure 8:
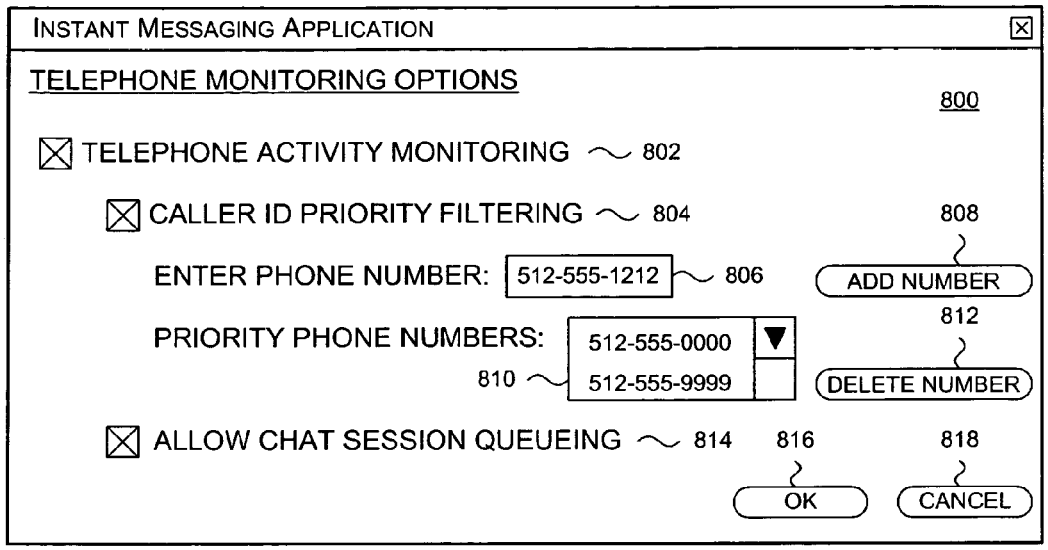
FIG. 8 depicts a diagram that shows a graphical user interface window for an instant messaging application that allows a user of the instant messaging application to enter or select configuration parameters that will be used to control the manner in which the instant messaging application operates with respect to its telephone activity monitoring unit.

Yet another reason that a user may not be able to engage in a chat session is that the user is busy using the telephone. Assuming that the telephone line is connected to the host computer, telephone activity monitoring unit 524 is able to use modem interface 534 of the host computer to monitor whether the telephone line is busy; it may be assumed that telephone activity monitoring unit 524 has the ability to determine if the telephone line is being used by a telephone for a voice call as compared to a fax application/device or a modem application for a dial-up service. Chat client 502 may be able to automatically set the user's current chat status at a given time based on the telephone usage information that reflects the user's activity at that given time. FIG. 8 below illustrates an example of a graphical user interface window that a user may employ to set configuration parameters for telephone activity monitoring unit 524.

Figure 9:
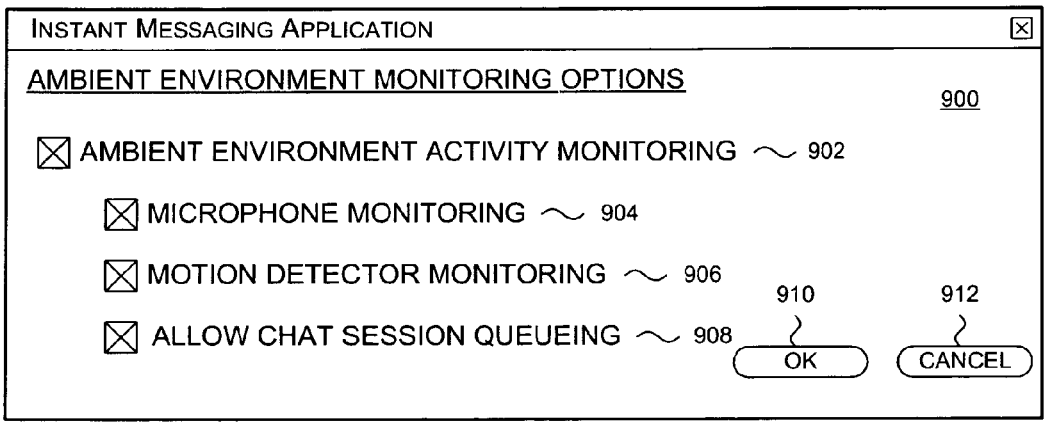
FIG. 9 depicts a diagram that shows a graphical user interface window for an instant messaging application that allows a user of the instant messaging application to enter or select configuration parameters that will be used to control the manner in which the instant messaging application operates with respect to its ambient environment monitoring unit.

One more reason that a user may not be able to engage in a chat session is that the user is busy doing some task near the host computer that probably does not involve using the host computer. Ambient environment monitoring unit 526 gathers information about current conditions within the host computer's ambient environment using one or more detectors within the host computer's ambient environment. Chat client 502 may be able to automatically set the user's current chat status at a given time based on the ambient environment information that reflects the user's activity or inactivity in the ambient environment at that given time. FIG. 9 below illustrates an example of a graphical user interface window that a user may employ to set configuration parameters for ambient environment monitoring unit 526.

For example, ambient environment monitoring unit 526 can use microphone interface 536 to detect sound in the room that contains the host computer. An absence of sound may indicate that the user is not within the room, thereby indicating that the user is not available to engage in a chat session. Ambient environment monitoring unit 526 may include a voice analysis component to detect human voices in the gathered sound data, the presence of which may indicate that the user is engaged in a conversation with another person in the room or on the telephone and, hence, is busy such that he or she cannot engage in a chat session.

As another example, ambient environment monitoring unit 526 can use motion detector interface 538 to detect motion in the room that contains the host computer. An absence of movement in the room may indicate that the user is not within the room, thereby indicating that the user is not available to engage in a chat session. However, movement in the room may indicate that the user is busy performing some other task such that the user is available or unavailable to engage in a chat session; the indication of availability or unavailability may be controlled by the user through configuration parameters.

With reference now to FIG. 6, a diagram depicts a graphical user interface window for an instant messaging application that allows a user of the instant messaging application to enter or select configuration parameters that will be used to control the manner in which the instant messaging application operates with respect to its schedule monitoring unit. As noted above, a chat client may be able to automatically set the user's current chat status at a given time based on retrieved schedule information that reflects the user's activity at that given time. Window 600 is a GUI window within an instant messaging client application that allows a user to set configuration parameters for controlling the manner in which the instant messaging application obtains and uses the user's schedule information. Window 600 may be presented after the user has selected a menu within the main application window of the instant messaging client application or has otherwise issued a command within the instant messaging application to request the option to set configuration parameters.

Check box 602 allows a user to select whether schedule monitoring is enabled. Text entry field 604 allows a user to enter some form of identifier for a file, a datastore, or a Uniform Resource Identifier (URI) that identifies a location from which the user's schedule information can be retrieved. "Add File" button 606 adds the schedule information identifier from text entry field 604 to scrollable list 608 of schedule information identifiers; another button could be provided that opens a dialog window that allows the user to choose a file from different disk drives, directories, etc. "Delete File" button 610 deletes a user-selected schedule information identifier from list 608.

Check box 612 allows the user to select whether chat session invitations should be queued while the user is unavailable as determined by the analysis of the schedule information. In other words, the user can choose an option in which any chat sessions that other users try to initiate while the user's chat status is "busy" due to user activity in other applications will be queued up until the user's chat status changes back to a chat status that indicates that the user is available to engage in a chat session, such as "online"; if a chat session invitation is queued, then the other user who has initiated the chat session may be provided with an option to allow the chat session to remain queue or an option to terminate the chat session invitation. Other options could be provided to the user that allow the user to select when the user's schedule information is retrieved or to select the manner in which the chat client determines when to allow the user's schedule information: (a) to override other automatically detected events; (b) to override the user's manual selection of a user chat status; (c) to be overridden by other automatically detected events or by the user's manual selection of a user chat status. "OK" button 614 closes window 600 and accepts any of the changes that have been made by the user, e.g., by storing the user selections as configuration parameters, such as chat client configuration parameters 518 that are shown in FIG. 5. "Cancel" button 616 closes window 600 while discarding any changes that have been made by the user. Other options could be provided to the user, such as allowing the user to select how often the instant messaging application retrieves the schedule information.

With reference now to FIG. 7, a diagram depicts a graphical user interface window for an instant messaging application that allows a user of the instant messaging application to enter or select configuration parameters that will be used to control the manner in which the instant messaging application operates with respect to its application activity monitoring unit. As noted above, a chat client may be able to automatically set the user's current chat status at a given time based on user activity in other applications at that given time. Window 700 is a GUI window within an instant messaging client application that allows a user to set configuration parameters for controlling the manner in which the instant messaging application obtains and uses information about the user's activities with respect to other applications. Window 700 may be presented after the user has selected a menu within the main application window of the instant messaging client application or has otherwise issued a command within the instant messaging application to request the option to set configuration parameters.

Check box 702 allows a user to select whether application monitoring is enabled. Text entry field 704 allows a user to enter some form of identifier for an application that should be monitored. "Add App" button 706 adds the application identifier from text entry field 704 to scrollable list 708 of application identifiers; "Delete App" button 710 deletes a user-selected application identifier from list 708. Another button could be provided that opens a dialog window that allows the user to choose an application from different disk drives, directories, etc.

A user adds an application to this list of applications because the user does not want to be bothered with chat session invitations when the user is using one or more of these applications. When application monitoring is enabled, list 705 of applications is used to check whether one or more of the applications are active at that time; if so, then the user is assumed to be busy, and the user's current chat status is updated to reflect the situation. Another configuration option may be provided to the user that allows the user to configure whether usage of a single application is sufficient for the instant messaging application to determine that the user is unavailable for a chat session as determined by the detected activity of monitored applications. A similar configuration option may be provided to the user that allows the user to configure specific combinations of applications that are to be used to determine an unavailability status for the user.

Check box 712 allows the user to select whether chat session invitations should be queued while the user is unavailable as determined by the detected activity of monitored applications. "OK" button 712 closes window 700 and accepts any of the changes that have been made by the user, e.g., by storing the user selections as configuration parameters, such as chat client configuration parameters 518 that are shown in FIG. 5. "Cancel" button 714 closes window 700 while discarding any changes that have been made by the user.

With reference now to FIG. 8, a diagram depicts a graphical user interface window for an instant messaging application that allows a user of the instant messaging application to enter or select configuration parameters that will be used to control the manner in which the instant messaging application operates with respect to its telephone activity monitoring unit. As noted above, a chat client may be able to automatically set the user's current chat status at a given time based on information about usage of a telephone that may reflect the user's activity at that given time. Window 800 is a GUI window within an instant messaging client application that allows a user to set configuration parameters for controlling the manner in which the instant messaging application obtains and uses the information concerning the telephone activity. Window 800 may be presented after the user has selected a menu within the main application window of the instant messaging client application or has otherwise issued a command within the instant messaging application to request the option to set configuration parameters.

Check box 802 allows a user to select whether telephone activity monitoring is enabled. Check box 804 allows a user to select whether caller ID filtering is enabled; if this option is enabled, then the chat client performs certain operations when it detects telephone activity. In one exemplary embodiment in which the feature of caller ID filtering is implemented, if a telephone call is answered and caller ID filtering is enabled, the chat client modifies the user's current chat status, e.g., from an "online" status to an "on-the-phone" status, only if the caller ID number that is associated with the incoming call matches one of the caller ID numbers that the user has entered. In this manner, the user's chat client only displays the more restrictive "on-the-phone" status when the incoming call has originated from someone that the user wants to provide his or her uninterrupted attention. Text entry field 806 allows a user to enter a priority phone number. "Add Number" button 808 adds the phone number from text entry field 806 to scrollable list 810 of priority telephone numbers; another button could be provided that opens a dialog window that allows the user to choose a telephone number from different address books, contact lists, telephone number directories, etc. "Delete Number" button 812 deletes a user-selected priority telephone number from list 810.

Check box 814 allows the user to select whether chat session invitations should be queued while the user is unavailable due to a priority telephone call. In other words, the user can choose an option in which any chat sessions that other users try to initiate while the user's chat status is "on-the-phone" will be queued up until the user's chat status changes back to a chat status that indicates that the user is available to engage in a chat session, such as "online". "OK" button 816 closes window 800 and accepts any of the changes that have been made by the user, e.g., by storing the user selections as configuration parameters, such as chat client configuration parameters 518 that are shown in FIG. 5. "Cancel" button 818 closes window 800 while discarding any changes that have been made by the user.

Another configuration option may be provided to the user that allows the user to combine the monitoring of other applications with the monitoring of telephone activity. For example, a user could select one or more applications (e.g., a web browser application) in which monitored application activity, when coupled with the detection of telephone activity, indicate that the user is not very busy with the telephone call; hence, the user can receive chat session invitations, whereas the user would not received a chat session invitation if the user was solely engaged with telephone activity.

Yet another configuration option may be provided to the user that allows the user to combine the monitoring of telephone activity with schedule information. For example, the user would be indicated as having an unavailable chat status only if the user's schedule information for the current time-of-day indicates that the received telephone call is marked as "important".

With reference now to FIG. 9, a diagram depicts a graphical user interface window for an instant messaging application that allows a user of the instant messaging application to enter or select configuration parameters that will be used to control the manner in which the instant messaging application operates with respect to its ambient environment monitoring unit. As noted above, a chat client may be able to automatically set the user's current chat status at a given time based on information about the local environment that surrounds a host data processing system on which the chat client is executing; it is assumed that information about a user's activities at that given time within the ambient environment may be gleaned. Window 900 is a GUI window within an instant messaging client application that allows a user to set configuration parameters for controlling the manner in which the instant messaging application obtains and uses the information about the ambient environment. Window 900 may be presented after the user has selected a menu within the main application window of the instant messaging client application or has otherwise issued a command within the instant messaging application to request the option to set configuration parameters.

Check box 902 allows a user to select whether ambient environment monitoring is enabled. Check box 904 allows a user to select whether microphone monitoring is enabled; if this option is enabled, then the chat client performs certain operations when it either detects or does not detect sound through a microphone connected to the host computer. Check box 906 allows a user to select whether motion detector monitoring is enabled; if this option is enabled, then the chat client performs certain operations when it either detects or does not detect motion through a motion detector connected to the host computer. For example, an absence of sound and/or motion may be an indication that the user is not in the proximity of the host computer and thus unavailable for a chat session. Conversely, a detection of sound and/or motion may be an indication that the user is in the proximity of the host computer and thus available for a chat session; however, the chat client could be alternatively configured such that a detection of sound and/or motion may be an indication that the user is in the proximity of the host computer but is unavailable for a chat session because the user is performing some other task during which the user does not wish to be disturbed.

Check box 908 allows the user to select whether chat session invitations should be queued while the user is unavailable as determined by detection of activity or inactivity in the ambient environment. "OK" button 910 closes window 900 and accepts any of the changes that have been made by the user, e.g., by storing the user selections as configuration parameters, such as chat client configuration parameters 518 that are shown in FIG. 5. "Cancel" button 912 closes window 900 while discarding any changes that have been made by the user.

Figure 10:
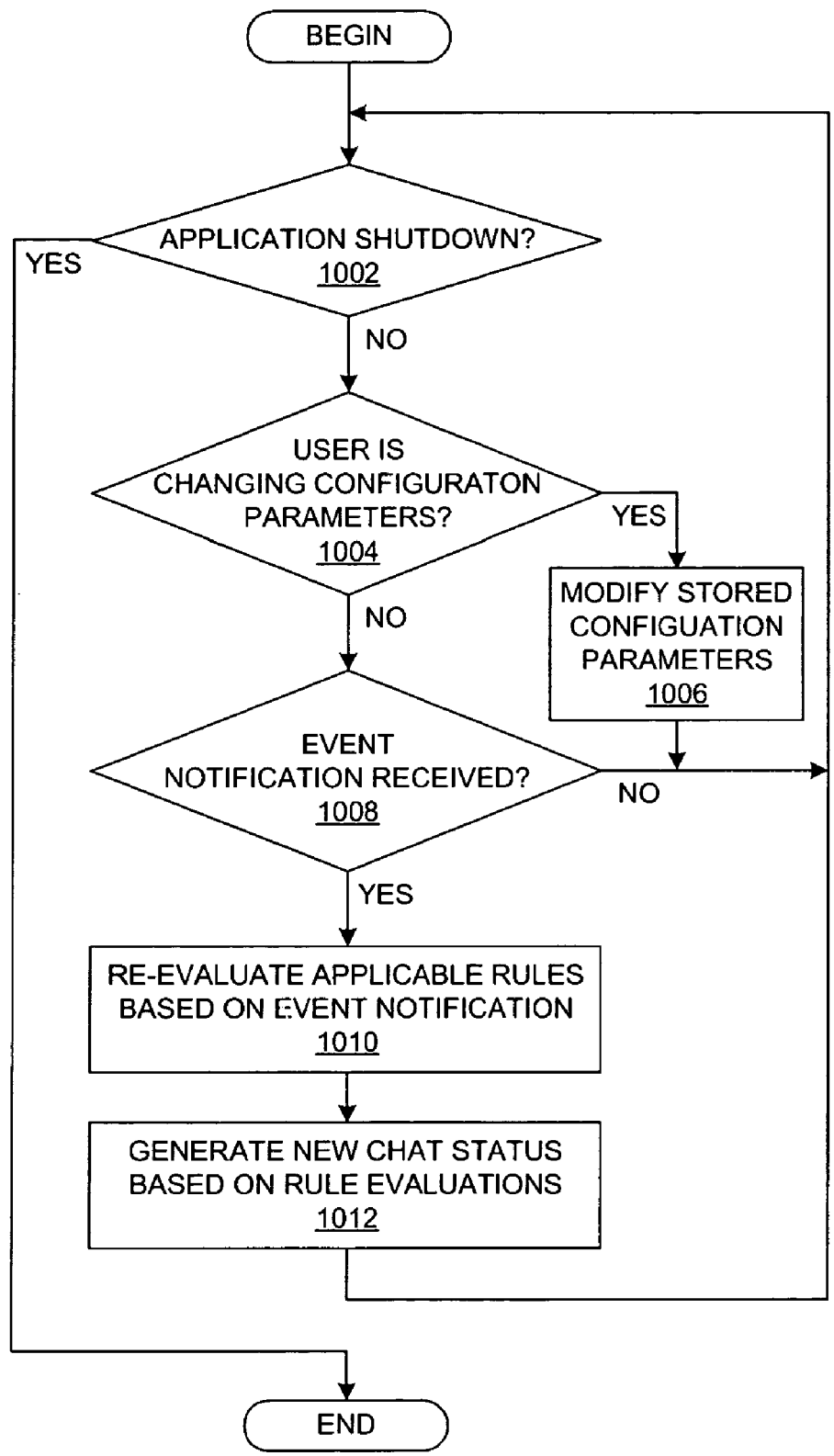
FIG. 10 depicts a flowchart that shows an event processing loop within an instant messaging application in which various types of detected events are processed to determine if the user chat status should be automatically changed based on a detected event in accordance with an embodiment of the present invention.

With reference now to FIG. 10, a flowchart depicts an event processing loop within an instant messaging application in which various types of detected events are processed to determine if the user chat status should be automatically changed based on a detected event in accordance with an embodiment of the present invention. The process commences with a check to see if the instant messaging application is being shutdown (step 1002), e.g., in response to a user request to exit the chat application; if so, then the process is concluded. If the chat application is not shutting down, then a determination is made as to whether the user is modifying the configuration parameters of the chat application (step 1004), e.g., as discussed above with respect to FIGS. 6-9. If so, then the updated values of the configuration parameters are stored (step 1006), and the process branches back to step 1002 to re-enter the event loop.

If the user is not modifying the configuration parameters, the instant messaging application checks whether an event notification has been received or whether an event has been detected (step 1008). For example, the chat client monitoring units, such as a schedule monitoring unit, the application activity monitoring unit, the telephone activity monitoring unit, and the ambient environment monitoring unit, may generate event notification records for each detected event. The chat status computation unit may poll the chat client monitoring units in a synchronous manner via request and response messages/calls for information about detected events. Alternatively, the chat client monitoring units may asynchronously submit information about any detected events to the chat status computation unit. In another alternative embodiment, the chat client monitoring units may merely store updated information in appropriate data structures, possibly protected by semaphores, and the chat status computation unit would retrieve the updated information when necessary. In any case, if no events have been detected, then the process branches back to step 1002 to re-enter the event loop. If an event has been detected, then the chat status computation unit re-evaluates the applicable chat status rules in view of the detected event (step 1010) and, if necessary, generates a new chat status value based on the outcome of the rule evaluations (step 1012). The process then branches back to step 1002 to re-enter the event loop.

With respect to the schedule monitoring unit, an event may include an automatic detection of a change in the user's schedule information, which may be performed by comparing a current schedule file with a previous schedule file or by merely detecting an updated timestamp on a current version of a schedule file as compared to a previous version of a schedule file. Alternatively, the schedule monitoring unit may record an event for each retrieval of the user's schedule information. For example, after the schedule monitoring unit has retrieved and processed the user's schedule information, the schedule monitoring unit sends an event notification to the chat status computation unit, or the schedule monitoring unit stores a processing flag that indicates that the schedule-related information has been updated by the schedule monitoring unit, which would be considered an event with respect to the schedule monitoring functionality.

Figure 11:
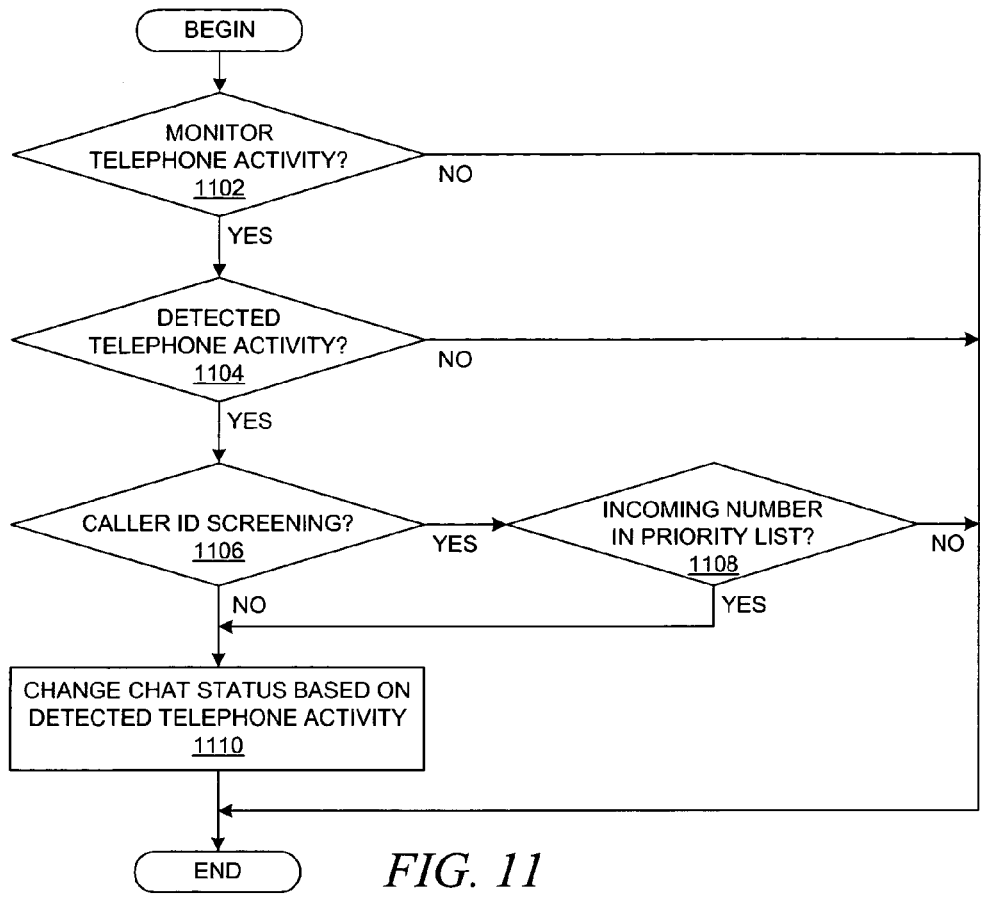
FIG. 11 depicts a flowchart that shows a process for re-evaluating applicable chat status rules based on detected telephone activity events in accordance with an embodiment of the present invention.

With reference now to FIG. 11, a flowchart depicts a process for re-evaluating applicable chat status rules based on detected telephone activity events in accordance with an embodiment of the present invention. As noted above, various types of chat client monitoring units, such as a schedule monitoring unit, the application activity monitoring unit, the telephone activity monitoring unit, and the ambient environment monitoring unit, may generate event information for detected events. FIG. 11 shows further detail with respect to events that might be detected by a telephone activity monitoring unit, although similar processes may be implemented within a chat application for other types of activity monitoring units in accordance with the processing options that might be selected by a user through the user's selection of configuration parameters that are appropriate for the type of activity monitoring. More specifically, FIG. 11 shows further detail for step 1010 and step 1012 in FIG. 10 with respect to a telephone activity monitoring unit; using the exemplary configuration of components within a chat client as shown in FIG. 5, the process that is shown within FIG. 11 would be performed by the chat status computation unit.

The process commences with a determination of whether the chat client should be monitoring telephone activity (step 1102). At a previous point in time, the user may have set a configuration parameter through a GUI window that instructs the chat client whether or not the user desires to employ the available functionality of monitoring telephone activity; step 1102 checks the appropriate configuration parameter to determine whether the user has chosen the configuration option that employs the monitoring of telephone activity.

In one embodiment, each activity monitoring unit may retrieve a copy of the applicable configuration parameters in order to guide or control its own operation; in that case, a telephone activity monitoring unit may not perform any operations to detect telephone activity. However, it is assumed that the process that is shown in FIG. 11 may operate in accordance with an alternative embodiment in which each activity monitoring unit may perform its operations to detect activity events and to generate information about those events, regardless of the value of the configuration parameters. Hence, the telephone activity monitoring unit generates information about a telephone activity event, whether or not the user has already chosen a configuration option to disregard telephone activity events. The chat status computation unit subsequently uses the configuration parameters to determine whether to use the generated information about detected events, as shown by step 1102 in FIG. 11.

Referring again to step 1102, if the user has not selected to monitor telephone activity, then the process is concluded. If the user has selected to monitor telephone activity, then the process determines whether any telephone activity has actually been detected (step 1104). If not, then the process is concluded. If telephone activity has been detected, then the process determines if the user has selected to filter the incoming telephone call by the caller ID number that is associated with the telephone call (step 1106). If so, then a determination is made as to whether the received caller ID number is included in the priority telephone number list (step 1108).

As mentioned above, different actions may be associated with the screening of the incoming telephone numbers. In the example that is shown in FIG. 11, it is assumed that the chat client does not change the user's chat status if the telephone number is not included in a priority list of telephone numbers, e.g., as shown in FIG. 8. In other words, if an incoming telephone call does not originate from a priority telephone number, then the user allows the chat client to continue to show that the user is available to participate in a chat session; in that case, the user is allowing the user's attention to be distracted away from a non-priority telephone call toward a chat session. The situation may be reversed; if an incoming telephone call originates from a priority telephone number, then the user does not allow the chat client to continue to show that the user is available to participate in a chat session because the user's chat status would be automatically modified according to the chat status rules, in which case the user does not want the user's attention to be distracted away from a priority telephone call toward a chat session.

Referring again to step 1108, if the received caller ID number is not included in the priority telephone number list, then the process is concluded. If the received caller ID number is included in the priority telephone number list as determined at step 1108, or if the user has not selected to filter the incoming telephone call by the caller ID number that is associated with the telephone call as determined at step 1106, then the process continues by automatically changing the user's chat status based on the detected telephone activity in accordance with the chat status rules (step 1110), and the process is concluded.

Figure 12A:
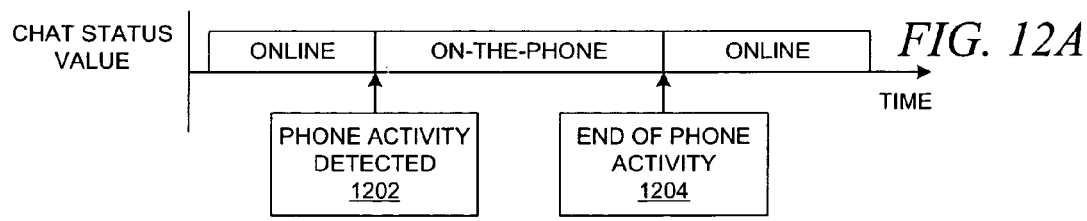
FIGS. 12A-12B depicts a pair of timelines that show different sets of user chat status over time that would be caused by different user choices of configuration parameters with respect to telephone activity monitoring options.
Figure 12B:
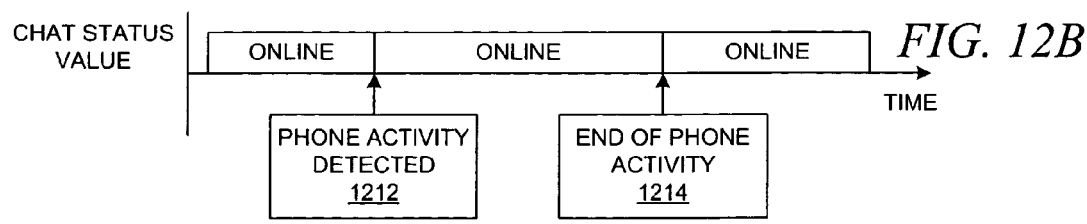

With reference now to FIGS. 12A-12B, a pair of timelines show different sets of user chat status over time that would be caused by different user choices of configuration parameters with respect to telephone activity monitoring options. Referring to FIG. 12A, a user's chat status is initially shown as "online", e.g., within a chat client window such as window 400 in FIG. 4 or as reported to other users of the instant messaging system. At time point 1202, telephone activity is detected, and the host system for the chat client obtains the associated caller ID information for the incoming call; the telephone activity monitoring unit stores the caller ID value and an indicator that the telephone is active such that this information may be retrieved by the chat computation unit. The chat computation unit subsequently retrieves this information, e.g., as shown at step 1008 in FIG. 10, and then re-evaluates the chat status rules for telephone activity in accordance with the appropriate configuration parameters, e.g., as shown in FIG. 11. In FIG. 12A, it is assumed that the user has selected options to monitor telephone activity with caller ID screening, and it is assumed that the incoming telephone call has originated from a priority telephone number. Based on this selection of configuration options and the data for the current telephone activity, the chat computation unit automatically changes the user's chat status from "online" to "on-the-phone" such that the user is not bothered with a chat session while the priority telephone call is active.

The chat client then performs other operations as if the user is unavailable for chat sessions; for example, if the user has selected an option to queue chat session invitations while having the "on-the-phone" status, then any chat sessions that other users attempt to initiate during that time period are not displayed until the telephone call has been completed and the user's chat status is no longer "on-the-phone".

At time point 1204, the telephone activity monitoring unit detects that the telephone call has ended, and the telephone activity monitoring unit deletes the caller ID value and sets an indicator that the telephone is not active; a flag value might be set merely to show that a change in telephone activity has been detected. This information would be retrieved by the chat computation unit, which would then automatically change the user's chat status from "on-the-phone" to "online" such that the user can engage in chat sessions.

Referring to FIG. 12B, a user's chat status is initially shown as "online. At time point 1212, telephone activity is detected, and the host system for the chat client obtains the associated caller ID information for the incoming call; the telephone activity monitoring unit stores the caller ID value and an indicator that the telephone is active such that this information may be retrieved by the chat computation unit. The chat computation unit subsequently retrieves this information, e.g., as shown at step 1008 in FIG. 10, and then re-evaluates the chat status rules for telephone activity in accordance with the appropriate configuration parameters, e.g., as shown in FIG. 11. In FIG. 12B, it is assumed that the user has not selected the option to monitor telephone activity, or the user has selected the option to monitor telephone activity but the incoming telephone call has not originated from a priority telephone number. In either case, based on this selection of configuration options and the data for the current telephone activity, the chat computation unit does not automatically change the user's chat status from "online" to "on-the-phone"; the user's chat status remains "online". The chat client then performs other operations as if the user is available for chat sessions, even though the user may be talking on the telephone.

At time point 1214, the telephone activity monitoring unit detects that the telephone call has ended, and the telephone activity monitoring unit deletes the caller ID value and sets an indicator that the telephone is not active; a flag value might be set merely to show that a change in telephone activity has been detected. This information would be retrieved by the chat computation unit, but the change in information does not result in a change in the user's chat status after evaluating the chat status rules.

The advantages of the present invention should be apparent in view of the detailed description that is provided above. Busy users that generally do not want to be disturbed by instant messaging sessions while performing tasks external to the instant messaging client can request that the instant messaging client automatically set user chat status based on detected activity or detected inactivity of the user. Another way to think of user activity/inactivity is as a continuum or set of user activity states from intensely active (and thus unlikely to respond to chat session messages), to moderately active (more likely to respond), to inactive (likely not present and thus unlikely to respond also).

It is important to note that while the present invention has been described in the context of a fully functioning data processing system, those of ordinary skill in the art will appreciate that the processes of the present invention are capable of being distributed in the form of instructions in a computer readable medium and a variety of other forms. Examples of computer readable media include media such as EPROM, ROM, tape, paper, floppy disc, hard disk drive, RAM, and CD-ROMs.

A method is generally conceived to be a self-consistent sequence of steps leading to a desired result. These steps require physical manipulations of physical quantities. Usually, though not necessarily, these quantities take the form of electrical or magnetic signals capable of being stored, transferred, combined, compared, and otherwise manipulated. It is convenient at times, principally for reasons of common usage, to refer to these signals as bits, values, parameters, items, elements, objects, symbols, characters, terms, numbers, or the like. It should be noted, however, that all of these terms and similar terms are to be associated with the appropriate physical quantities and are merely convenient labels applied to these quantities.

The description of the present invention has been presented for purposes of illustration but is not intended to be exhaustive or limited to the disclosed embodiments. Many modifications and variations will be apparent to those of ordinary skill in the art. The embodiments were chosen to explain the principles of the invention and its practical applications and to enable others of ordinary skill in the art to understand the invention in order to implement various embodiments with various modifications as might be suited to other contemplated uses.

What is claimed is:

1. A computer program product stored on a computer-readable medium for managing user chat status values in an instant messaging application on a data processing system, wherein a user chat status value indicates the availability of a user to participate in an instant messaging session, the computer program product comprising:

instructions for allowing a user to select one or more priority telephone numbers that are screened for activity;

instructions for automatically detecting user activity and/or user inactivity external to an instant messaging application, wherein the instructions for automatically detecting user activity and/or user inactivity external to an instant messaging application comprises instructions for automatically determining user activity and/or user inactivity based on telephone line activity;

instructions for automatically screening caller ID information associated with an incoming telephone call with respect to the one or more priority telephone numbers; and instructions for automatically setting a user chat status value within the instant messaging application based on the detected user activity and/or the detected user inactivity, wherein the instructions for automatically setting a user chat status value within the instant messaging application based on the detected user activity and/or the detected user inactivity, comprises instructions for automatically setting a chat status based on telephone line activity only if the caller ID information associated with the incoming telephone call matches a priority telephone number.

2. The computer program product of claim 1 further comprising:

instructions for automatically resetting a user chat status value within the instant messaging application based on a cessation of the detected user activity and/or the detected user inactivity.

3. An apparatus for managing user chat status values in an instant messaging application, wherein a user chat status value indicates the availability of a user to participate in an instant messaging session, the apparatus comprising:

a bus;

a communications unit connected to the bus;
a storage device connected to the bus, wherein the storage device includes program code; and
a processor unit connected to the bus, wherein the processor unit runs the program code to:
allow a user to select one or more priority telephone numbers that are screened for activity;
automatically detect user activity and/or user inactivity external to an instant messaging application, wherein the automatically detecting the user activity and/or the user inactivity external to the instant messaging application comprises automatically determining the user activity and/or the user inactivity based on telephone line activity;
automatically screen caller ID information associated with an incoming telephone call with respect to the one or more priority telephone numbers; and
automatically set a user chat status value within the instant messaging application based on the detected user activity and/or the detected user inactivity, wherein the setting the user chat status value within the instant messaging application based on the detected user activity and/or the detected user inactivity comprises automatically setting the chat status based on telephone line activity only if the caller ID information associated with the incoming telephone call matches a priority telephone number.

4. The apparatus of claim 3, wherein the processor unit further runs the program code to:
automatically reset a user chat status value within the instant messaging application based on a cessation of the detected user activity and/or the detected user inactivity.

* * * * *